(12) United States Patent  (10) Patent No.: US 6,719,080 B1
Gray, Jr.  (45) Date of Patent: Apr. 13, 2004

(54) HYDRAULIC HYBRID VEHICLE (75) Inventor: Charles L. Gray, Jr., Pinckney, MI (US)

(73) Assignee: The United States of America as represented by the Administrator of the Enviromental Protection Agency, Washington, DC (US)

( * ) Notice: Subject to any disclaimer, the term of this patent is extended or adjusted under 35 U.S.C. 154(b) by 0 days.

(21) Appl. No.: 09/479,844

(22) Filed: Jan. 10, 2000

(51) Int. Cl.[7] ................................................. B62M 1/10
(52) U.S. Cl. .......................................... 180/165; 60/414
(58) Field of Search ............................... 180/165, 305, 180/307, 308; 60/414, 416, 425, 417

(56) References Cited

U.S. PATENT DOCUMENTS

| | | | | |
|---|---|---|---|---|
| 4,018,052 A | * | 4/1977 | Laussermair | 60/414 |
| 4,098,083 A | * | 7/1978 | Carman | 60/414 |
| 4,098,144 A | * | 7/1978 | Besel et al. | 180/165 |
| 4,223,532 A | | 9/1980 | Shiber | 60/414 |
| 4,813,234 A | * | 3/1989 | Nikolaus | 60/414 |
| 4,888,949 A | * | 12/1989 | Rogers | 180/370 |
| 5,495,912 A | | 3/1996 | Gray et al. | 180/165 |
| 5,505,527 A | | 4/1996 | Gray et al. | 303/3 |
| 5,507,144 A | | 4/1996 | Gray et al. | 60/327 |
| 5,579,640 A | | 12/1996 | Gray et al. | 60/413 |
| 5,887,674 A | | 3/1999 | Gray, Jr. | 180/307 |

* cited by examiner

*Primary Examiner*—Kenneth R. Rice
*Assistant Examiner*—Elaine Gort
(74) *Attorney, Agent, or Firm*—Lorusso, Loud & Kelly (57) ABSTRACT

An automotive powertrain includes a hydraulic drive circuit including at least one of: (1) a hydraulic pump/motor having a shaft fixed to for rotation with the crankshaft of an internal combustion engine and (2) a pair of pump/motors coaxially arranged to share a common shaft on which is mounted a gear of a gear set for transmitting output to the vehicle drive wheels. Hydraulic control logics are provided for control of the various pump/motors of the hybrid powertrain.

35 Claims, 9 Drawing Sheets

HYDRAULIC HYBRID VEHICLE

BACKGROUND OF THE INVENTION

1. Field of the Invention

The present invention is a unique automotive powertrain design that allows highly efficient use of energy generated by an integrated internal combustion engine. Field of application is in automotive powertrains.

2. The Prior Art

The growing utilization of automobiles greatly adds to the atmospheric presence of various pollutants including greenhouse gases such as carbon dioxide. Current powertrains typically average only about 15% thermal efficiency. Accordingly, new approaches to improve the efficiency of fuel utilization for automotive powertrains are needed.

Conventional automotive powertrains result in significant energy loss, make it difficult to effectively control emissions, and offer limited potential for improvements in automotive fuel economy. Conventional powertrains consist of an internal combustion engine and a simple mechanical transmission having a discrete number of gear ratios. Due to the inefficiencies described below, about 85% to 90% of the fuel energy consumed by such a system is wasted as heat. Only 10%–15% of the energy is available to overcome road load, and much of this is dissipated as heat in braking.

Much of the energy loss is due to a poor match between engine power capacity and average power demand. The load placed on the engine at any given instant is directly determined by the total road load at that instant, which varies between extremely high and extremely low load. To meet acceleration requirements, the engine must be many times more powerful than average road load would require. The efficiency of an internal combustion engine varies significantly with load, being best at higher loads near peak load and worst at low load. Since the vast majority of road load experienced in normal driving is near the low end of the spectrum, the engine must operate at poor efficiency (e.g., less than 20%) much of the time, even though conventional engines have peak efficiencies in the 35% to 40% range.

Another major source of energy loss is in braking. In contrast to acceleration which requires delivery of energy to the wheels, braking requires removal of energy from the wheels. Since an internal combustion engine can only produce and not reclaim energy, and a simple gear transmission can only transmit it, a conventional powertrain is a one-way energy path. Braking is achieved by a friction braking system, which renders useless the temporarily unneeded kinetic energy by converting it to heat.

The broad variation in speed and load experienced by the engine in a conventional powertrain also makes it difficult to effectively control emissions because it requires the engine to operate at many different conditions of combustion. Operating the engine at more constant speed and/or load would allow much better optimization of any emission control devices, and the overall more efficient settings of the engine would allow less fuel to be combusted per mile traveled.

Conventional powertrains offer limited potential to bring about improvements in automotive fuel economy except when combined with improvements in aerodynamic drag, weight, and rolling resistance. Such refinements can only offer incremental improvements in efficiency, and would apply equally well to improved powertrains.

Hybrid vehicle systems have been investigated as a means to mitigate the above-described inefficiencies. A hybrid vehicle system provides a "buffer" between road load demand and the internal combustion engine in order to moderate the variation of power demand experienced by the engine. The buffer also allows regenerative braking because it can receive and store energy. The effectiveness of a hybrid vehicle system depends on its ability to operate the engine at peak efficiencies, on the capacity and efficiency of the buffer medium, and on the efficiency of the transmission system that transfers power to the drive wheels. Typical buffer media include electric batteries, mechanical flywheels, and hydraulic accumulators.

To use a hydraulic accumulator as the buffer, a hydraulic pump/motor is integrated into the system. The pump/motor interchangeably acts as a pump or motor. As a pump, engine power rotates a shaft that pumps hydraulic fluid to an accumulator where it is pressurized against a volume of gas (e.g., nitrogen). As a motor, the pressurized fluid is released through the unit, spinning the shaft and producing power. See, for example U.S. Pat. No. 4,223,532 issued Sep. 23, 1980 to Samual Shiber.

Other U.S. Patents disclosing such hybrid powertrains include:

Hybrid Powertrain Vehicle—U.S. Pat. No. 5,495,912 issued Mar. 5, 1996;

Anti-Lock Regenerative Braking System—U.S. Pat. No. 5,505,527 issued Apr. 9, 1996;

Accumulator Engine—U.S. Pat. No. 5,579,640 issued Dec. 3, 1996;

Lightweight, Safe Hydraulic Power System & Method of Operation Thereof—U.S. Pat. No. 5,507,144 issued Apr. 16, 1996; and Continuously Smooth Transmission—U.S. Pat. No. 5,887,674 issued Mar. 30, 1999.

SUMMARY OF THE INVENTION

The present invention provides an automotive powertrain including a pair of drive wheels and a hydraulic circuit including at least one accumulator for receiving hydraulic fluid, storing pressure and discharging the stored pressure. The hydraulic circuit further includes first and second pump/motors or a first hydraulic pump/motor in combination with the second hydraulic pump. The first hydraulic pump/motor, operating in its motor mode, drives the drive wheels responsive to receipt of hydraulic fluid and, in a pump mode, pumps hydraulic fluid to the accumulator responsive to braking. The second hydraulic pump or hydraulic pump/motor has a shaft fixed to the crankshaft of an internal combustion engine by which it is driven, as a pump, for pumping hydraulic fluid to at least one of the accumulator and the first hydraulic pump/motor, when the latter is operating in a motor mode. Preferably, the first and second hydraulic pumps or pumps/motors are inline piston machines or, more preferably, bent-axis piston machines.

The present invention also provides an automotive powertrain including a pair of drive wheels, an internal combustion engine with a crankshaft for power output and a hydraulic power circuit. Hydraulic power circuit includes at least one accumulator for receiving hydraulic fluid, storing pressure and discharging the stored pressure. A gear set serves to transfer power from at least one hydraulic pump/motor to the drive wheels. In a preferred embodiment, two drive hydraulic pump/motors incorporated into the hydraulic power circuit are located on opposing sides of one gear of the gear set and share a common input/output shaft having that one gear mounted thereon. These first and second hydraulic pump/motors may operate either in a motor mode to drive the pair of drive wheels through the gearshaft or in a pump mode for pumping hydraulic fluid into the accumulator responsive to braking of the drivewheels. A third hydraulic pump or pump/motor driven by the internal combustion engine serves to pump hydraulic fluid to the accumulator and/or the first and second hydraulic pump/motors to drive those pump/motors in a motor mode, thereby powering the vehicle. Again, the pumps and/or pump/motors are preferably inline piston machines and more preferably bent-axis piston machines. The third hydraulic pump or pump/motor may have a driveshaft fixed to the crankshaft of the internal combustion engine as in the above-described aspect of the invention.

The present invention also provides hydraulic control logic for control of hydraulic fluid in powertrains of the types described above. More specifically, the present invention provides an automotive powertrain including a pair of drive wheels, an internal combustion engine with power output through a crankshaft and a hydraulic drive circuit. A first pump/motor, when operating in a motor mode, serves to drive the drive wheels responsive to receipt of high pressure fluid from a high pressure line and operates in a pump mode to deliver high pressure fluid to the high pressure line responsive to braking of the drive wheels. The hydraulic circuit further includes a high pressure accumulator for receiving and discharging high pressure fluid through the high pressure line and a low pressure line and a low pressure accumulator for receiving and discharging low pressure fluid through the low pressure line. The hydraulic control logic includes first and second lines connecting, in parallel, to one side of the first pump/motor to the high pressure and low pressure lines, respectively, with the first parallel line having a first valve which opens to admit high pressure fluid from the high pressure line into the one side of the first pump/motor in forward drive. The second parallel line has a second valve which opens to admit low pressure fluid from the low pressure line to the one side of the first pump/motor in reverse drive. Third and fourth parallel lines serve to connect, in parallel, a second side of the first pump/motor to the high pressure and low pressure lines, respectively. The third parallel line has a third valve which opens to admit low pressure fluid from the low pressure line to the second side of the first pump/motor in forward drive. The fourth parallel line has a fourth valve which opens to admit high pressure fluid from the high pressure line to the second side of the first pump/motor in reverse drive. Similar control logics may be provided to control operation of the second pump/motor and, optionally, a third pump/motor. First and third pump/motors may share a common shaft with a gear of a reduction gear unit as in a feature of the present invention described above.

The present invention also provides an automotive powertrain which, as in the other aspects of the present invention includes a pair of drive wheels, an internal combustion engine with power output through a crankshaft and a hydraulic drive circuit. The hydraulic drive circuit includes high pressure and low pressure lines and a first pump/motor operable over center, in a motor mode, for driving the drive wheels responsive to receipt of high pressure fluid from the high pressure line and for operating in a pump mode to deliver high pressure fluid to the high pressure line responsive to braking of the drive wheels. The hydraulic drive circuit further includes a second pump/motor operable over center and driven by the internal combustion engine for operation in a pump mode to deliver high pressure fluid to the high pressure line. The hydraulic drive circuit also includes high pressure and low pressure accumulators and a hydraulic control logic. Here, the hydraulic control logic includes first and second parallel lines for connecting, in parallel, one side of the first pump/motor to the high pressure line and low pressure line, respectively. The first parallel line has a first valve which opens to admit high pressure fluid from the high pressure line to the one side of the first pump/motor. The second parallel line has a valve for preventing fluid flow from the high pressure line directly into the low pressure line. In this hydraulic drive circuit, a second side of the first pump/motor is connected directly to the low pressure line. The second and optionally third pump/motor are provided with similar hydraulic control logics.

The hydraulic hybrid vehicle powertrain of the present invention is a unique powertrain that performs all the functions of a conventional powertrain, but at a much higher level of energy efficiency. This novel powertrain efficiently converts the kinetic energy of the moving vehicle into potential energy when decelerating (i.e., braking) the vehicle, and this energy is stored on the vehicle for subsequent re-use. The powertrain employs a unique, integrated design of various conventional and novel components necessary for energy and cost efficient operation. Also, a unique hydraulic fluid flow circuit and unique operational control logic are utilized to achieve the full energy efficiency improvements which can be realized through this new powertrain. Many of the unique features of this new powertrain apply to electric hybrid powertrains as well.

DESCRIPTION OF THE PREFERRED EMBODIMENTS

Figure 1:
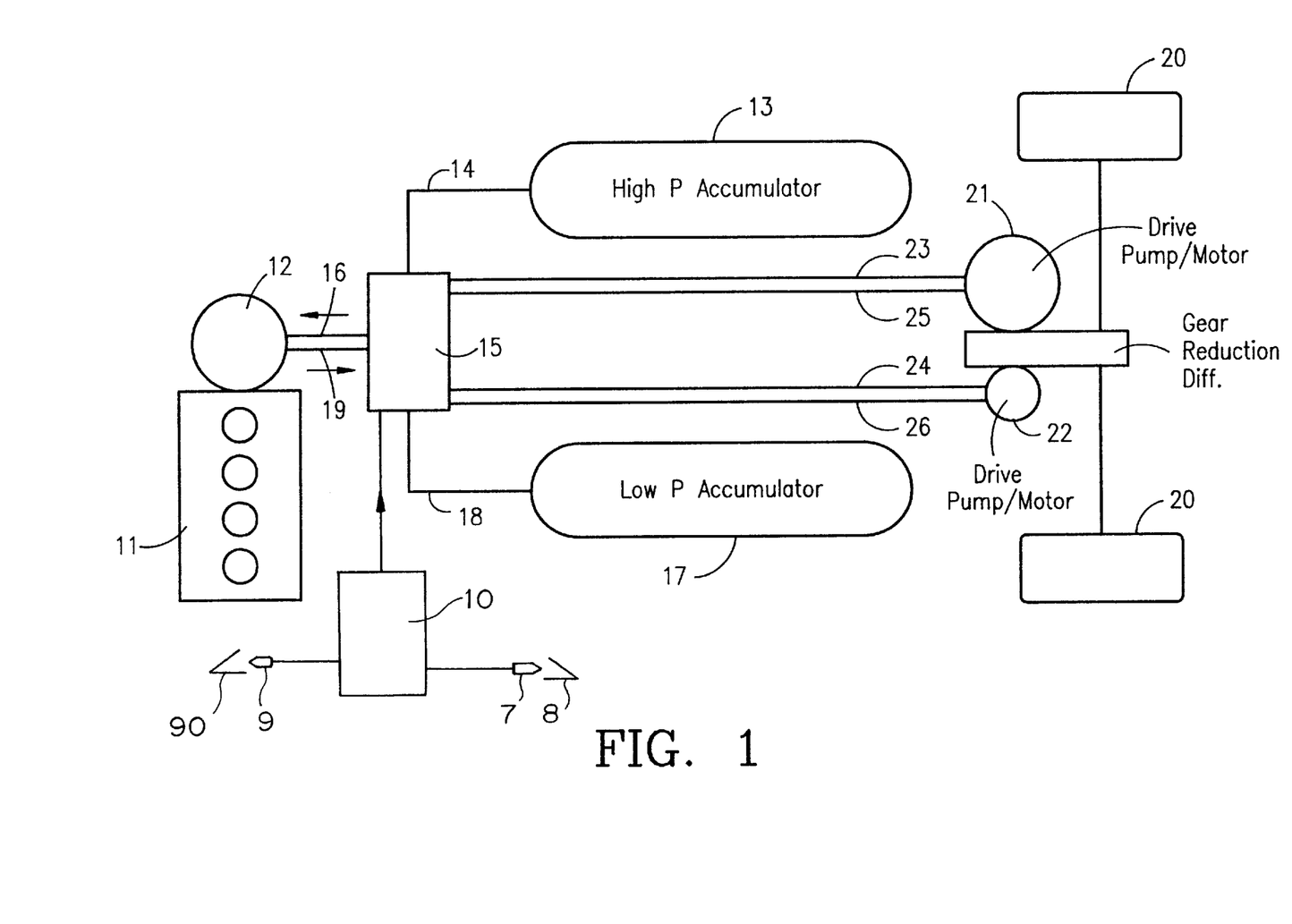
FIG. 1 is a block diagram of a preferred embodiment of a powertrain of the present invention.

Referring to FIG. 1, an engine 11 is first started by and then drives pump/motor 12. High pressure hydraulic fluid is supplied by high pressure accumulator 13, through line 14, through hydraulic control circuit 15, through line 16, to pump/motor 12, acting as a motor to start engine 11. Low pressure fluid is discharged from pump/motor 12, acting as a motor through line 19, through hydraulic control circuit 15, through line 18, to low pressure accumulator 17. When started, engine 11 drives pump/motor 12 in its pump mode.

An electronic control circuit 10 receives various signals, including a signal from sensor 9 indicative of the position of accelerator pedal 90, and outputs control signals to the hydraulic control circuit 15.

Low pressure hydraulic fluid is supplied by low pressure accumulator 17, through line 18, through hydraulic control circuit 15, and through line 16, to pump/motor 12 operating as a pump. Pump/motor 12 operates as a pump discharges high pressure fluid through line 19, through hydraulic control circuit 15, and through line 14, to high pressure accumulator 13. If power is being demanded to drive the wheels 20, high pressure fluid will also flow through either one or both lines 23 and 24, to either one or both of drive pump/motors 21 and 22 operating as motor(s). Low pressure fluid is discharged from one or both of pump/motors 21 and 22 acting as motor(s) through one or both lines 25 and 26, through control circuit 15, through line 18, to low pressure accumulator 17. When the pressure in high pressure accumulator 13 reaches a predetermined maximum value, engine 11 will stop delivering power to pump/motor 12 acting as a pump by either going into idle or being turned off. When the pressure in high pressure accumulator 13 reaches a predetermined minimum value, engine 11 will resume delivering power.

When it becomes necessary for the vehicle to brake, power is obtained from wheels 20 by operating one or both the drive pump/motors 21 and 22 as pumps by supplying low pressure fluid through one or both lines 23 and 24, and discharging high pressure fluid through one or both lines 25 and 26, through control circuit 15, through line 14, to high pressure accumulator 13. The design and functioning of control circuit 15 as well as the control are more fully described later.

Figure 2:
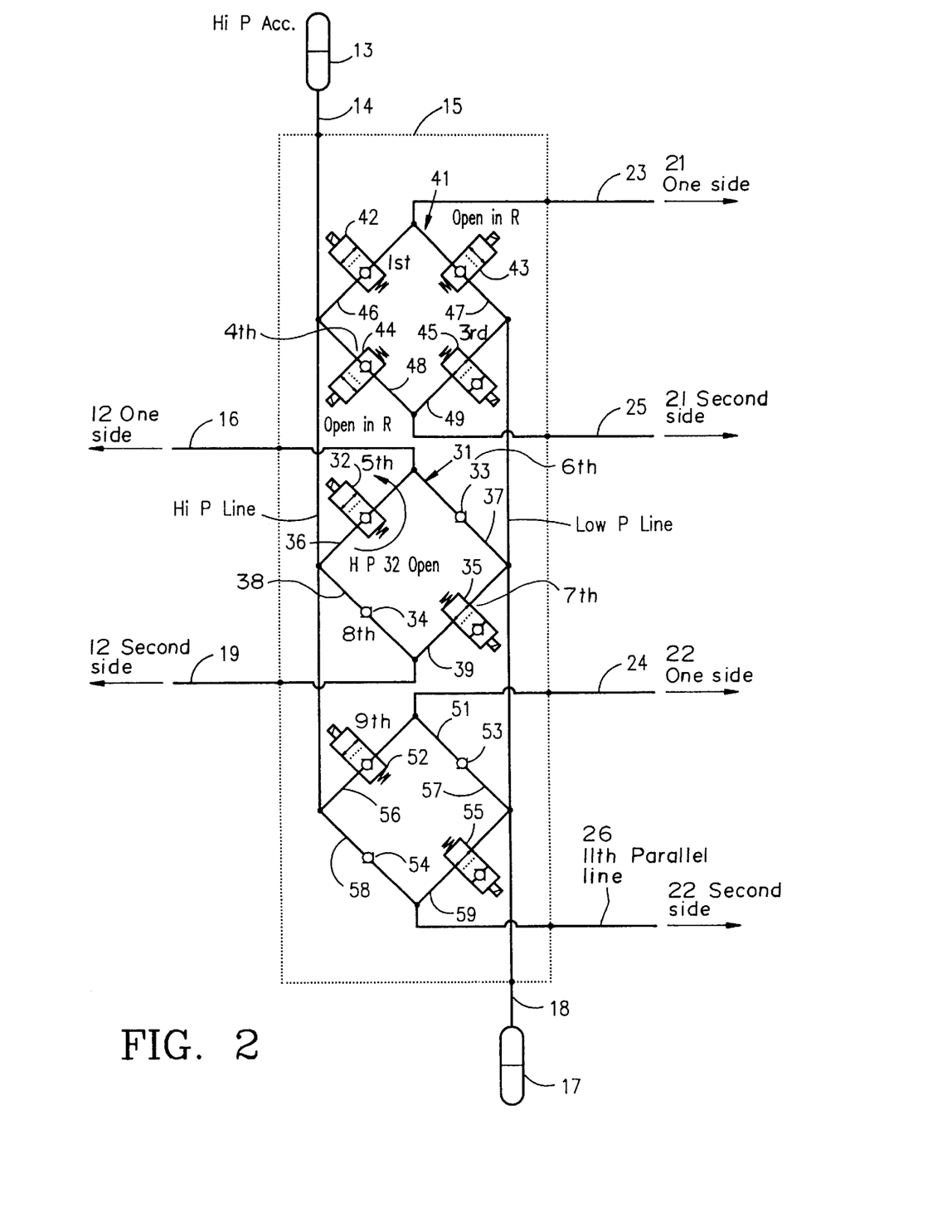
FIG. 2 is a circuit diagram of a first preferred embodiment of a hydraulic control circuit.

FIG. 2 is a schematic of the details of the hydraulic control circuit 15, for this first embodiment wherein the pump/motors do not go overcenter, i.e., the pump/motors do not provide for the reverse flow of hydraulic fluid while the pump/motor output shaft continues to rotate in the same direction. In this embodiment, valves 42–45, 32, 35, 52 and 55 each operate as check valves in a "closed" (checked) position. Valves 42, 44, 32 and 52 always allow high pressure flow from the pump/motors 12, 21 and 22 into high pressure line 14 and valves 43, 45, 35 and 55 always allow low pressure from pump/motors 12, 21 and 22 into low pressure line 18.

The middle subcircuit 31 controls the flow of fluid to and from pump/motor 12 through lines 16 and 19. Middle subcircuit connects one side of pump/motor 12 through line 16 to high pressure line 14 and to low pressure line 18 through, respectively (first and second), parallel lines 36 and 37. Likewise, a second side of pump/motor 12 is connected through line 19, in parallel, to high pressure line 14 and low pressure line 18 through parallel lines 38 and 39, respectively. For high pressure fluid to flow from high pressure line 14 through line 16 to pump/motor 12 acting as a motor to start engine 11, valve 32 is opened. Check valves 33 and 34 prevent high pressure fluid from flowing directly into the low pressure lines. Valve 35 must also be open (as shown in FIG. 2) when valve 32 is opened for the fluid to flow through pump/motor 12 acting as a motor with discharge through low pressure line 18 to low pressure accumulator 17.

When engine 11 has started, the displacement of pump/motor 12 is rapidly reduced to zero and valve 32 is returned to the closed or checked position as shown on FIG. 2. If the displacement of pump/motor 12 is not absolute zero or if there is some pump/motor 12 leakage, check valve 33 allows low pressure fluid to flow from low pressure line 18, to line 37, to line 16, and fluid would come from pump/motor 12 through line 19, through open valve 35 and parallel line 39 to low pressure line 18, thus preventing the possibility of cavitation of pump/motor 12 and establishing a neutral loop for low friction, neutral spinning of pump/motor 12. Valve 32 in its closed position operates as a check valve to prevent hydraulic lock or over pressure if the pump/motor 12 goes slightly overcenter. Neutral spinning of pump/motor 12 would be necessary after a cold engine start to allow the engine to warm up sufficiently before torque is required. When ready and needed, engine 11 drives pump/motor 12 acting as a pump. Valve 35 is first turned to the closed (or checked) position, and the displacement of pump/motor 12 is increased. Low pressure fluid flows from line 18 through check valve 33 and parallel line 37 through line 16 to pump/motor 12 acting as a pump. High pressure fluid leaves pump/motor 12 through line 19 through parallel line 38 and check valve 34 to high pressure line 14. Fluid will flow to high pressure accumulator 13 only, to both high pressure accumulator 13 and one or both of pump/motors 21 and 22 acting as motors, or to only one or both of pump/motors 21 and 22 acting as motors.

If power is being demanded to drive the wheels 20, high pressure fluid will flow from either one or both subcircuits 41 and 51, through one or both lines 23 and 24, to one or both drive pump/motors 21 and 22 acting as motor(s). The decision whether to use subcircuit 41, subcircuit 51, or both subcircuit 41 and 51 is described in U.S. Pat. No. 5,887,674 entitled "Continuously Smooth Transmission," the teachings of which are incorporated by reference herein. Subcircuit 41 has lines 46 and 47 connecting, through line 23, one side of pump/motor 21 in parallel with, respectively, high pressure line 14 and low pressure line 18. Subcircuit 41 connects a second side of pump/motor 21, through line 25, in parallel with high pressure line 14 and low pressure line 18 through parallel lines 48 and 49, respectively. If subcircuit 41 is commanded to supply high pressure fluid to line 23, valve 42 is opened (shown closed or checked in FIG. 2), and high pressure fluid flows from line 14, through valve 42 and parallel line 46 to line 23. If pump/motor 21 acting as a motor is commanded to provide torque to wheels 20, the displacement of pump/motor 21 is increased from zero to the desired level and high pressure fluid flows through line 23, through pump/motor 21 and returns at low pressure through line 25, through valve 45 in line 49 (shown already open in FIG. 2), and through line 18 to low pressure accumulator 17. Valves 43 and 44 are in the closed or checked position (as shown in FIG. 2) to prevent high pressure fluid from flowing to the low pressure side. The checked position of valve 43 prevents cavitation of pump/motor 21 if valve 42 is in the closed position.

Likewise, subcircuit 51 has lines 56 and 57 connecting, through line 24, one side of pump/motor 22 in parallel with, respectively, high pressure line 14 and low pressure line 18. Subcircuit 51 connects a second side of pump/motor 22, through line 26, in parallel with high pressure line 14 and low pressure line 18 through parallel lines 58 and 59, respectively. If subcircuit 51 is commanded to supply high pressure fluid to line 24, valve 52 is opened (shown closed or checked in FIG. 2), and high pressure fluid flows from line 14, through valve 52 to line 24. If pump/motor 22 acting as a motor is commanded to provide torque to wheels 20, the displacement of pump/motor 22 is increased from zero to the desired level and high pressure fluid flows through line 24, through pump/motor 22 and returns at low pressure through line 26, through valve 55 (shown already open in FIG. 2), and through line 18 to low pressure accumulator 17. Valves 53 and 54 are in the checked position (as shown in FIG. 2)

to prevent high pressure fluid from flowing to the low pressure side. The checked position of valve 53 prevents cavitation of pump/motor 22 if valve 52 is in the closed position.

When it becomes necessary for the vehicle to brake, power is obtained from wheels 20 by operating one or both the drive pump/motor(s) 21 and 22 as pumps by supplying low pressure fluid through one or both lines 23 and 24, utilizing one or both subcircuits 41 and 51. If subcircuit 41 is commanded to supply low pressure fluid to line 23, valve 45 is turned to the closed or checked position (shown in the open position in FIG. 2). All other valves (42, 43 and 44) remain in the closed or checked position as also shown in FIG. 2. Proportional to the brake pedal (not shown) depression, pump/motor 21 is commanded to increase its displacement and low pressure fluid will flow from line 18, through valve 43 and parallel line 47, through line 23, and through pump/motor 21, and high pressure fluid will flow through line 25, through valve 44 and parallel line 48, and through line 14, to high pressure accumulator 13. If subcircuit 51 is commanded to supply low pressure fluid to line 24, valve 55 is turned to the closed or checked position (shown in the open position in FIG. 2) All other valves (52, 53 and 54) remain in the closed or checked position as shown in FIG. 2. As with subcircuit 41 and pump/motor 21, proportional to the brake pedal depression, pump/motor 22 is commanded to increase its displacement and low pressure fluid is caused to flow from line 18, through valve 53 and parallel line 57, through line 24, and through pump/motor 22, and high pressure fluid will flow through line 26, through valve 54 and parallel line 58, and through line 14, to high pressure accumulator 13.

While one, two or more drive pump/motors could be served by a single subcircuit (preferably of the design of subcircuit 41 which also provides for a reverse drive to wheels 20 as will be described later), pairing individual subcircuits and individual drive pump/motors allows the turning off of high pressure fluid to any pump/motor not being commanded to provide positive or negative (braking) torque. Turning high pressure off to a pump/motor improves efficiency by significantly reducing fluid leakage through the pump/motor to the low pressure side. Pump/motor spinning torque/friction and fluid compressibility losses are also significantly reduced when the vehicle is moving, when a clutch is not used to disengage the pump/motor from the drive train.

When reverse vehicle direction is commanded, subcircuit 41 is utilized. Valves 44 and 43 are opened (shown in the closed or checked position in FIG. 2), valve 45 is closed (shown open in FIG. 2), and valve 42 remains in the closed/checked position as shown in FIG. 2. Proportional to "accelerator pedal" (not shown) depression, pump/motor 21 is commanded to increase its displacement and high pressure fluid will flow from line 14 through valve 44 and parallel line 48, through line 25, and through pump/motor 21, and low pressure fluid will flow through line 23, through valve 43 and parallel line 47, and through line 18, to low pressure accumulator 17. By reversing the high and low pressure sides of pump/motor 21, the pump/motor will rotate in the opposite direction. If higher reverse torque is desired, subcircuit 51 could be configured as subcircuit 41 and pump/motor 22 could be used to provide reverse torque as well.

The foregoing preferred embodiment includes the engine pump/motor 12 integrated with the engine crankshaft. The pump/motor pistons act directly on the end of the crankshaft. Since the pump/motor output shaft has become the engine crankshaft, only a common set of bearings is used, e.g., tapered roller bearing 127, and the pump/motor plane for barrel movement in pump/motor 12 is chosen to provide forces mitigating those imposed by the engine pistons on the crankshaft, to reduce bearing forces and thus bearing friction.

In the foregoing preferred embodiment the engine 11 bolts directly to the transmission housing. The transmission will thus contain the engine pump/motor and actuator, as well as all flow circuits and valves necessary for power transmission control as previously described, the two drive pump/motors and actuators of the preferred embodiment integrated with the drive shaft of the gear reduction section (with the planes of barrel movement located to mitigate the gear forces), and the gears required for speed reduction integrated with the differential assembly. The transmission has two primary hydraulic line connections, one to the high pressure accumulator (high pressure line 14) and one to the low pressure accumulator (low pressure line 18). The transmission has two secondary hydraulic oil line connections, one to supply low pressure lube oil to the pump/motors and gear reduction/differential assembly and one to return lubrication oil and any pump/motor case leakage oil to a holding vessel for reuse.

Figure 3:
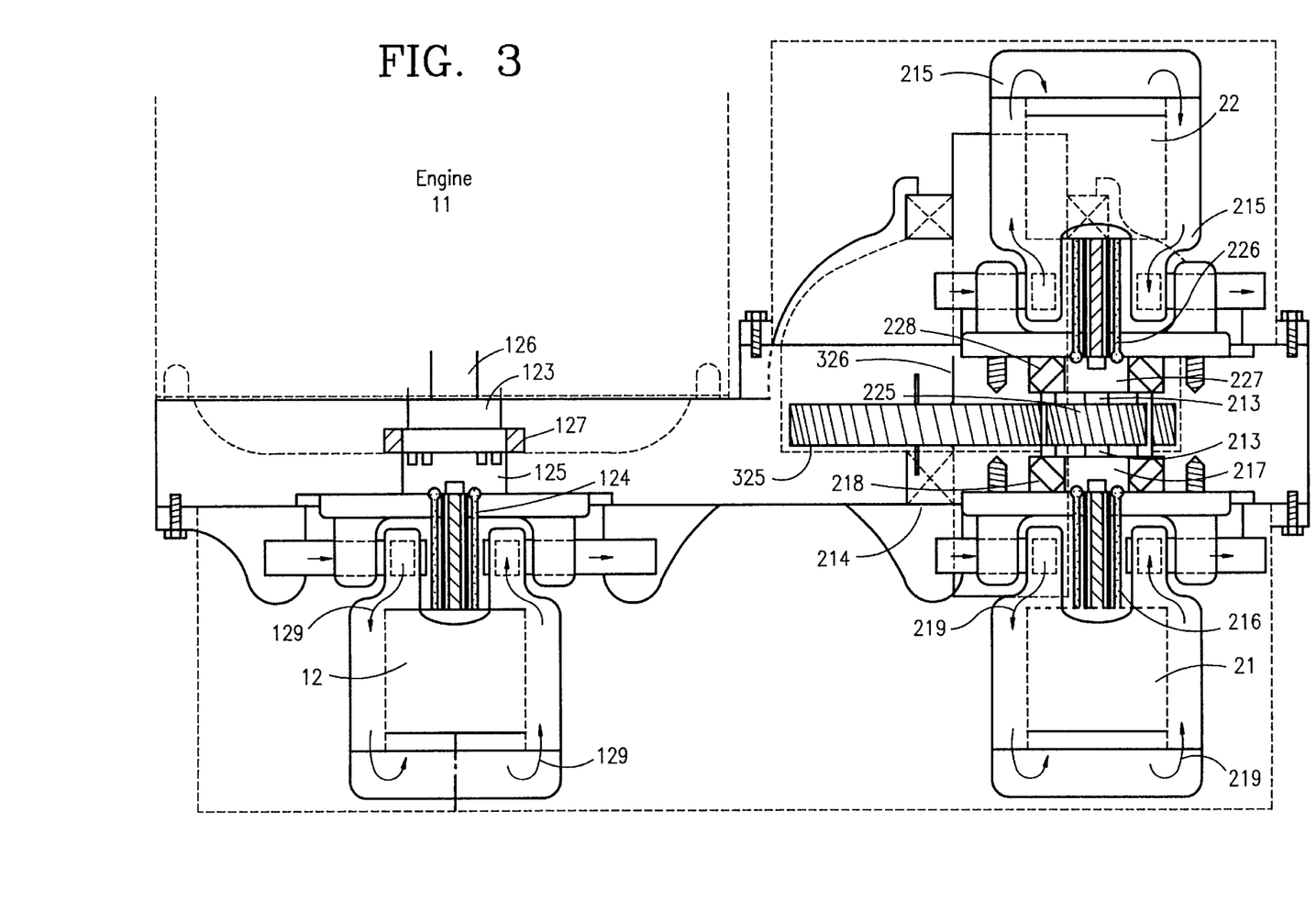
FIG. 3 is a schematic diagram of a preferred arrangement for the pump/motors of the powertrain of the present invention.

FIG. 3 shows the key components of the preferred embodiment of the hydraulic hybrid vehicle powertrain transmission in more detail. The engine pump/motor 12 is integrated with the engine crankshaft output flange 123. The pistons 124 of the engine bent axis pump/motor 12 act on rotating plate 125 which is attached directly to (or can be itself) the crankshaft flange 123. Since the pump/motor output shaft and the engine crankshaft are integrated into a single shaft 126, a common set of bearings 127 is used for both the crankshaft back main bearings and the pump/motor drive bearings. Arrows 129 indicate the flow path of hydraulic fluid through pump/motor 12.

The two drive pump/motors 21 and 22 of the preferred embodiment are integrated with the drive shaft 213 of the gear reduction assembly 214 that drives the smaller of the two drive gears 225. Gear 225 drives the larger of the two drive gears 325. Gear 325 is mounted on a drive shaft 326 which, in turn, is attached to a conventional differential assembly (not shown) which is connected through conventional drive axles (not shown) to drive wheels in the conventional manner. The drive pump/motor pistons 216 and 226 act on the rotating plates 217 and 227 which are attached directly to opposing ends of the small gear drive shaft 213. Since the pump/motor output shafts have been integrated with the small gear drive shaft into a single shaft 213, common sets of bearings 218 and 228 are used for both the small gear drive shaft bearings and the pump/motor drive bearings. Arrows 219 and 215 indicate the flow path of hydraulic fluid through the pump/motors 21 and 22, respectively, which are inline piston machines or, more specifically, bent-axis piston machines.

The hydraulic hybrid vehicle powertrain utilizes an operational control logic to maximize efficiency and performance characteristics. By managing the vehicle engine, the pump/motors through their associated displacement actuators, flow control valves, shut-off valves and other components of the vehicle. The electronic control system receives various inputs including drive torque demand (accelerator pedal position), vehicle speed, and pressure of the hydraulic fluid to determine output signals such as pump/motor displacements, valve positions, etc. The electronic control system controls the engine in response primarily to hydraulic system pressure, drive torque demand and vehicle speed.

Figure 4:
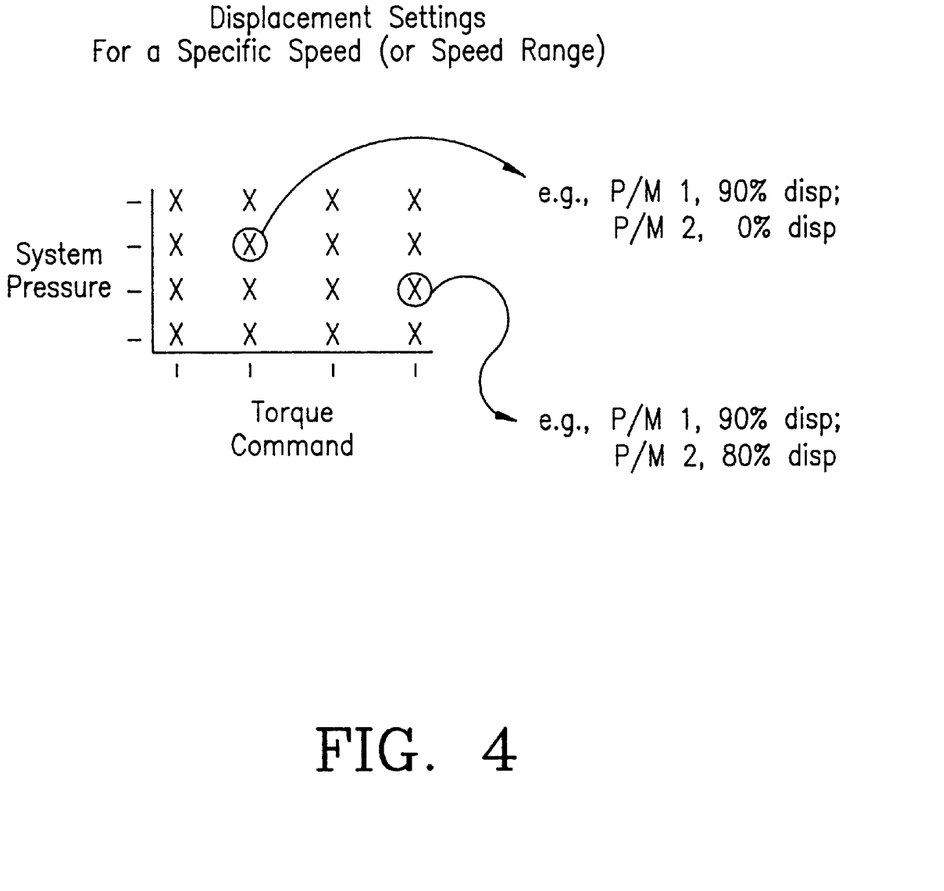
FIG. 4 represents a table of pump/motor displacement settings for a specific speed.

The operational control logic is consistent with the teachings of U.S. Pat. No. 5,495,912, the teachings of which are incorporated herein by reference, with additional unique control logic for the present invention as described later with reference to FIG. 6. Referring again to FIG. 1, one or both pump/motors 21 and 22 deliver positive (or zero) torque to wheels 20 in response to accelerator pedal 90 position by adjusting motor displacement, considering hydraulic system pressure and vehicle speed. Negative torque (i.e., braking) is delivered in a like manner in response to a signal from sensor 7 which detects brake pedal 8 position for the first portion of brake pedal depression, while the second portion of brake pedal depression phases in the conventional friction brakes (not shown) consistent with the teachings of U.S. Pat. No. 5,505,527, the teachings of which are incorporated herein by reference. Positive, zero or negative torque commands are satisfied with the highest efficiency displacement settings of the drive pump/motors available for that torque command, consistent with the teachings of U.S. Pat. No. 5,887,674, the teachings of which are incorporated herein by reference. High pressure hydraulic fluid may be turned off to any pump/motor that is set to zero displacement to reduce efficiency losses, as previously explained. Values for the best displacement settings (i.e., highest overall efficiency) for all drive pump/motors, for each possible driver torque command, are a single solution based on the hydraulic system pressure and vehicle speed. The electronic control unit 10 obtains displacement settings from correlation equations or from look-up tables, for example as illustrated in FIG. 4, stored in memory, in accordance with signals from sensor 9, and outputs command signals to hydraulic control circuit 15.

A second embodiment of the invention utilizes pump/motors that go overcenter, and substitutes a hydraulic control circuit 15 (FIG. 5) for hydraulic control circuit 15 (FIG. 2), but is otherwise as shown in FIG. 1. Valves 62, 72 and 82 provide a check valve function in their "closed" (checked) position whereby high pressure fluid from the pump/motors is always allowed to flow into said high pressure line. In this second preferred embodiment, valves are not needed to switch the high pressure and low pressure. Thus, when engine 11 has been started by pump/motor 12 acting as a motor and begins driving pump/motor 12 acting as a pump, the pump/motor displacement control mechanism (not shown) moves the piston stroking means overcenter, and the hydraulic fluid flow through the pump/motor is reversed. Therefore, when pump/motor 12 is operating as a pump, low pressure hydraulic fluid is supplied by low pressure accumulator 17, through line 18, through control circuit 15 (see FIG. 5), through line 19 to pump/motor 12 acting as a pump. Pump/motor 12 acting as a pump discharges high pressure fluid through line 16, through control circuit 15 (see FIG. 5), through line 14, to high pressure accumulator 13. If power is demanded to drive the wheels 20, high pressure fluid will also flow through either one or both lines 23 and 24, to either one or both drive pump/motors 21 and 22 acting as motor(s). Low pressure fluid is discharged from one or both of pump/motors 21 and 22 acting as motor(s) through one or both lines 25 and 26, through control circuit 15, through line 18, to low pressure accumulator 17.

Figure 5:
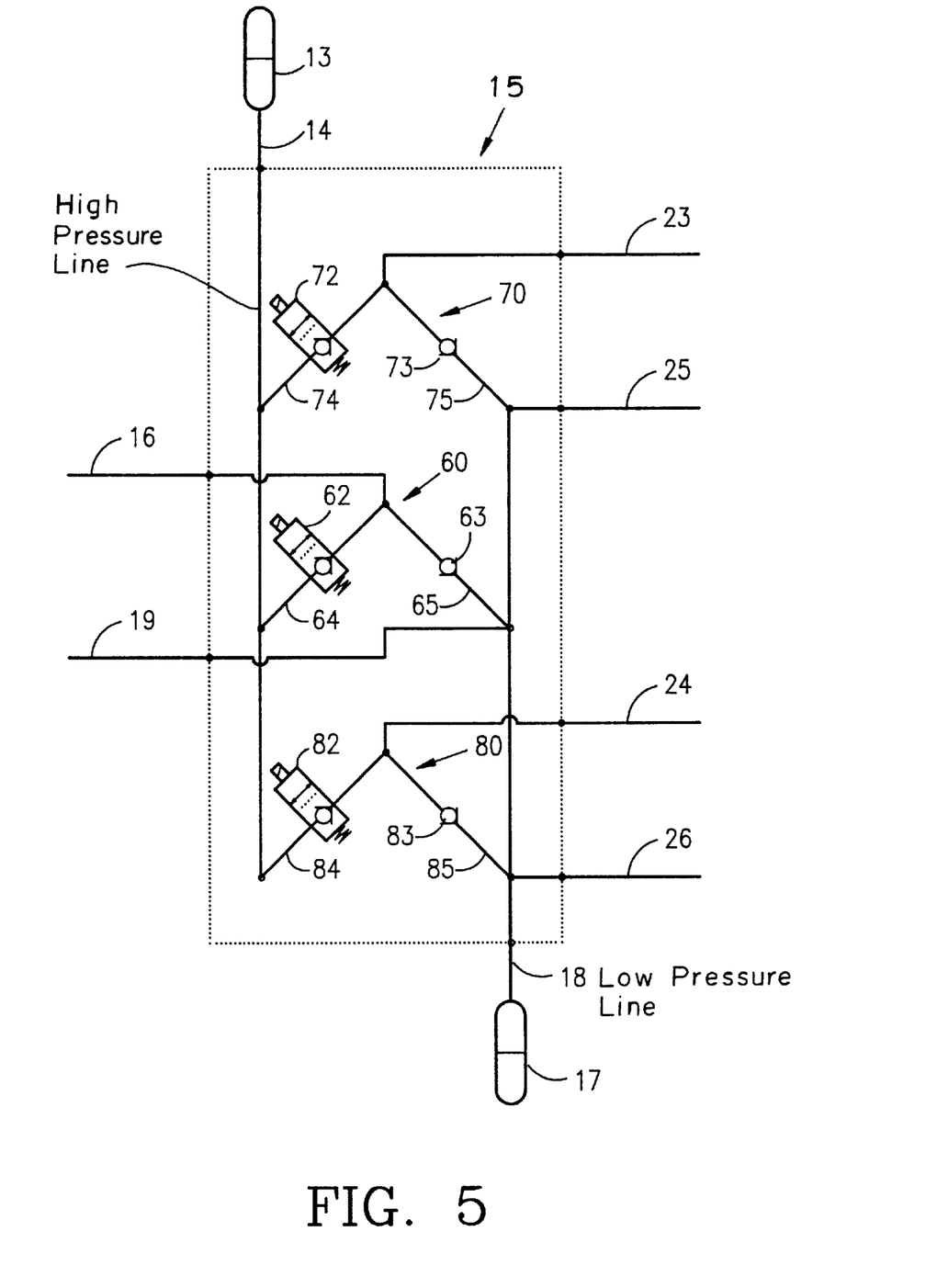
FIG. 5 is a circuit diagram of a second preferred embodiment of a hydraulic control logic.

When it becomes necessary for the vehicle to brake, power will be obtained from wheels 20 by operating one or both the drive pump/motors 21 and 22 as pumps by driving one or both pump/motors 21 and 22 overcenter, and the flow direction of the fluid will reverse. Low pressure fluid will flow through one or both lines 25 and 26, and discharge high pressure fluid through one or both lines 23 and 24, through control circuit 15, through line 14 to high pressure accumulator 13.

FIG. 5 shows the details of the control circuit 15 for the second embodiment utilizing overcenter pump/motors. The lines into and out of control circuit 15 are the same as in FIG. 1 and are so labeled. In the second embodiment of FIG. 5, the middle subcircuit 60 has lines 64 and 65 connecting, through line 16, one side of pump/motor 12 in parallel with, respectively, high pressure line 14 and low pressure line 18. Subcircuit 60 connects a second side of pump/motor 12, directly (without intervening valving) to low pressure line 18. The middle subcircuit 60 controls the flow of fluid to and from pump/motor 12. For high pressure fluid to flow from high pressure line 14 through line 16 to pump/motor 12 acting as a motor to start engine 11, valve 62 is opened. Low pressure fluid from pump/motor 12 acting as motor is discharged through low pressure line 19, through low pressure line 18 to low pressure accumulator 17.

When engine 11 has started, the displacement of pump/motor 12 is rapidly reduced to zero and valve 62 in line 64 is returned to the closed or checked position as shown in FIG. 5. If the displacement of pump/motor 12 is not absolute zero or if there is some pump/motor 12 leakage, optional check valve 63 in parallel line 65 allows low pressure fluid to flow to pump/motor 12 to prevent the possibility of cavitation of pump/motor 12 and establishes a neutral loop for low friction, neutral spinning of pump/motor 12. When ready and needed, engine 11 drives pump/motor 12 acting as a pump. Pump/motor 12 is stroked overcenter and the displacement in the overcenter direction is increased. Low pressure fluid flows from line 19, through pump/motor 12 acting as a pump. High pressure fluid is discharged into line 16, parallel line 64 and through valve 62 to line 14.

If power is being demanded to drive the wheels 20, high pressure fluid will flow from either one or both subcircuits 70 and 80, through one or both lines 23 and 24, to one or both drive pump/motors 21 and 22 acting as motor(s).

Subcircuit 70, which controls drive pump/motor 21, has lines 74 and 75 connecting, through line 23, one side of pump/motor 21 in parallel with, respectively, high pressure line 14 and low pressure line 18. Subcircuit 70 also connects a second side of pump/motor 21, directly (without intervening valving) to low pressure line 18. If subcircuit 70 is commanded to supply high pressure fluid to line 23, valve 72 is opened, and high pressure fluid flows from line 14, through parallel line 74 and valve 72 to line 23. If pump/motor 21 acting as a motor is commanded to provide torque to wheels 20, the displacement of pump/motor 21 is increased from zero to the desired level and high pressure fluid flows through line 23, through pump/motor 21 and returns at low pressure through line 25, through line 18 to low pressure accumulator 17. Optional check valve 73 in parallel line 75 prevents cavitation of pump/motor 21 if valve 72 is in the closed position. If subcircuit 80 is commanded to supply high pressure to line 24, its functions and those of valves 82 and optional check valve 83 are the same as those described for subcircuit 70, including return flow of low pressure fluid through line 26 to line 18.

When it becomes necessary for the vehicle to brake, power will be obtained from wheels 20 by operating one or both pump/motors 21 and 22 as pumps. If subcircuit 70 is commanded to operate pump/motor 21 as a pump, the actuator strokes the pump/motor overcenter and to the desired displacement. Low pressure fluid flows from low pressure accumulator 17, through line 18, through line 25 and into pump/motor 21 acting as a pump. High pressure fluid is discharged into line 23 and flows through parallel line 74, through valve 72, through line 14 and into high pressure accumulator 13. If subcircuit 80 is commanded to operate pump/motor 22 as a pump, its functions and those of valve 82 and optional check valve 83 are the same as those described for subcircuit 70.

When reverse vehicle drive is commanded, one or both pump/motors 21 and 22 and subcircuits 70 and 80 are utilized. Since subcircuits 70 and 80 operate identically, subcircuit 70 alone will be used to describe operation for reverse vehicle drive. Valve 72 is opened and pump/motor 21 is stroked overcenter to the command displacement, in the same manner as when pump/motor 21 acting as a pump is stroked for regenerative braking. High pressure fluid flows from line 14 through line 74, through valve 72, through line 23 and into pump/motor 21 acting as a motor in the reverse direction. Low pressure fluid is discharged into line 25, through line 18 and into low pressure accumulator 17.

Figure 6:
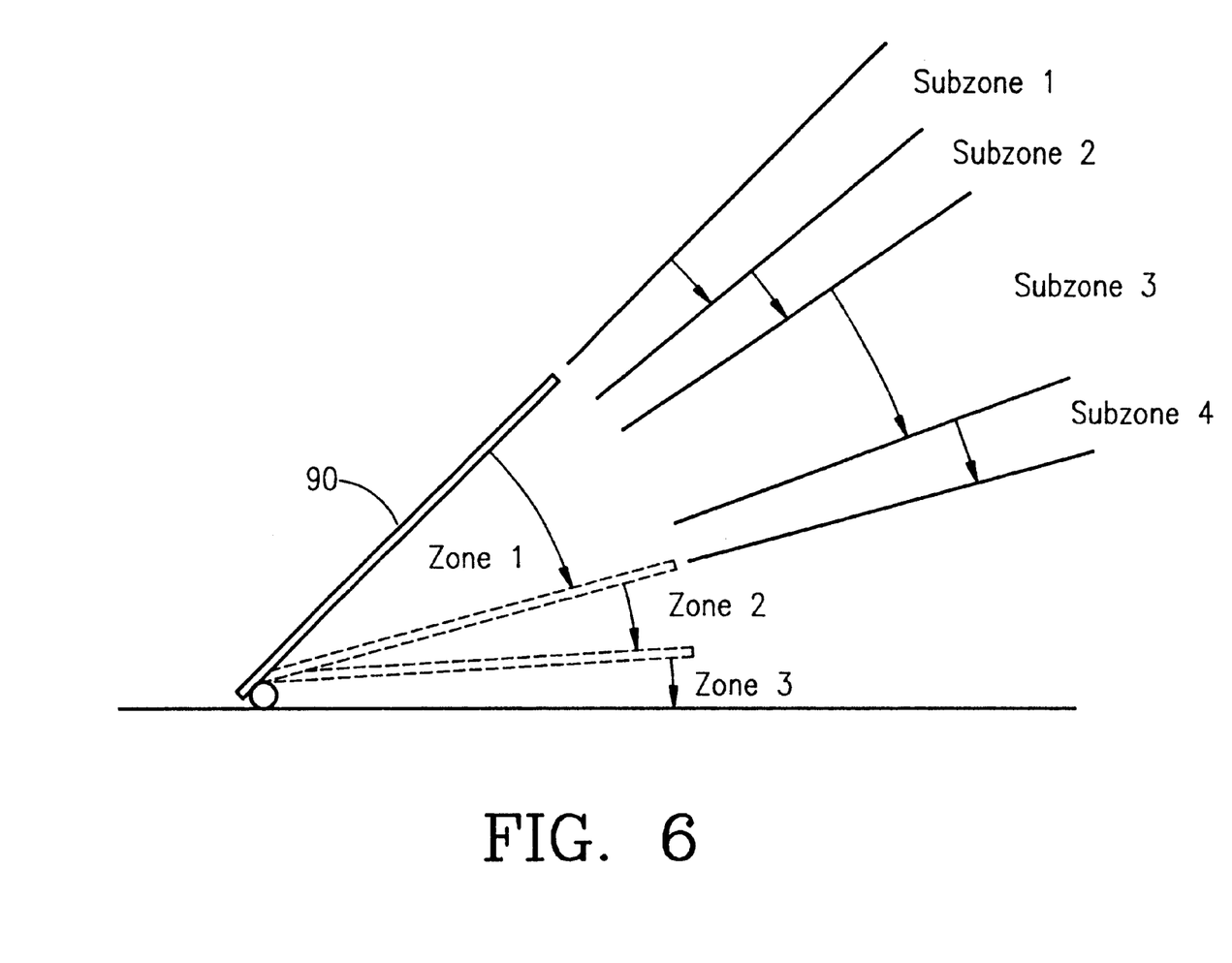
FIG. 6 illustrates a control scheme utilizing an accelerator pedal.
Figure 7:
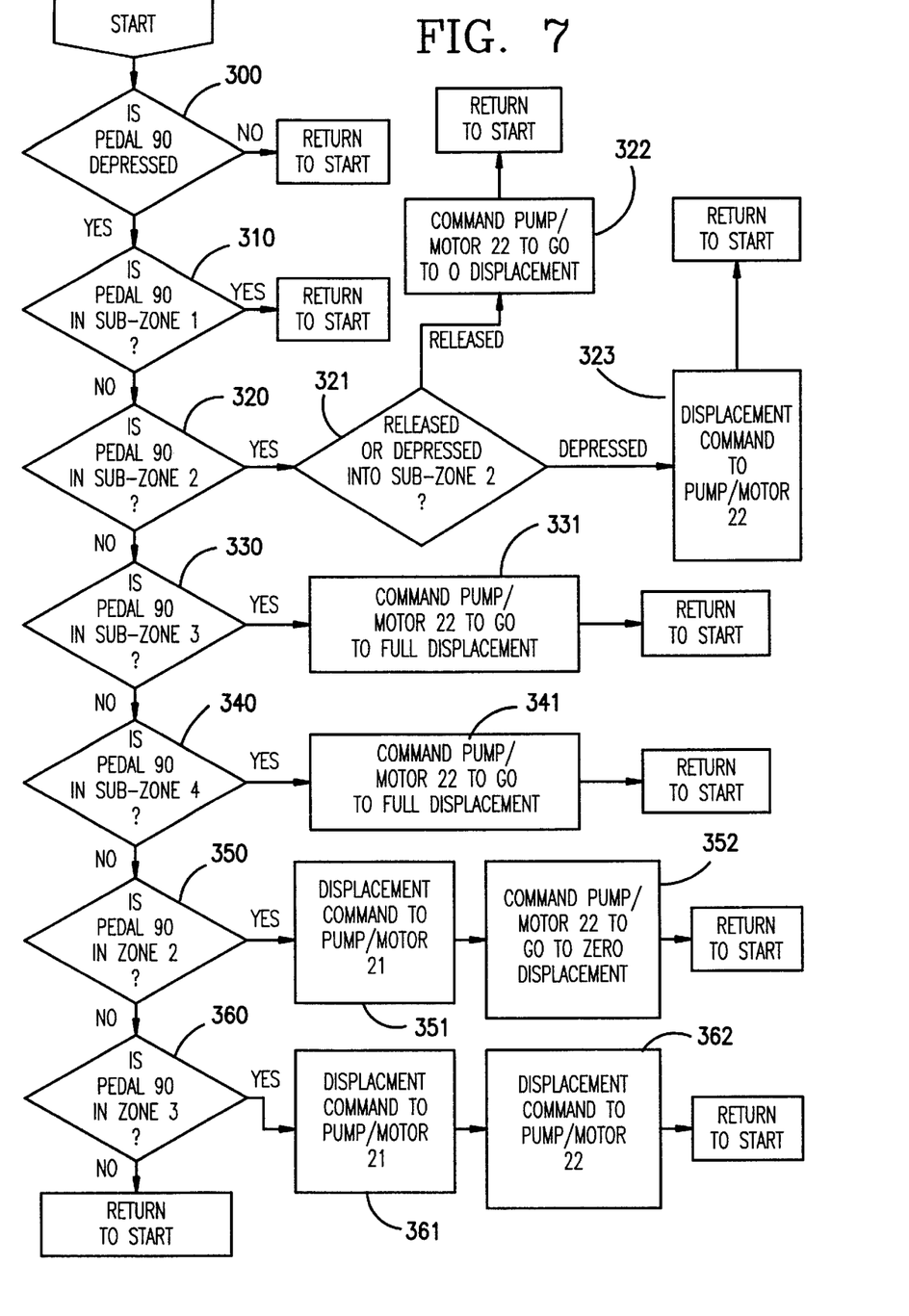
FIG. 7 is a flow chart of a preferred embodiment of a control program.

FIGS. 6 and 7 illustrate an operational control for the drive pump/motors which serves to encourage the vehicle driver to drive more efficiently. In the control illustrated in FIG. 6 operation of the drive pump/motors 21, 22 is controlled in accordance with position of the accelerator pedal 90 as detected by sensor 9. Zone 1 of the accelerator pedal movement corresponds to that depression where only the smallest drive pump/motor 22 is operating. Within Zone 1 there are four subzones of depression. The first subzone is a "dead band," with the control logic retaining the pump/motor at zero displacement to avoid the very inefficient, very low displacement (step 310). Accordingly, if pedal 90 is depressed ("YES" in step 300), the control routine of FIG. 7 proceeds to step 310 wherein presence of the pedal in sub-zone 1 does not result in a displacement command signal. Detection of a position within the second subzone (step 320) results in output of a command signal to operate the pump/motor between zero displacement and some minimally acceptable efficient displacement, considered here as ⅓ displacement. A determination is next made as to whether the pedal was depressed or released into sub-zone 2 (step 321). When the driver is depressing the pedal to a position within this second subzone, the control logic provides a slow response to the displacement command (e.g., taking 2 seconds to stroke from zero to a command for just less than ⅓ displacement) (step 323). Since the torque outputs from these commands are quite small, the driver will depress the pedal more if a more rapid torque increase is desired, thus minimizing time actually spent at less than ⅓ displacement. When the driver is releasing the pedal 90 to a position within subzone 2, the control logic sends the displacement to zero as quickly as possible (step 322). If the pedal 90 is again depressed within subzone 2, the control logic increases the displacement at a slow rate as before. The third subzone is ⅓ to full displacement, and the electronic control unit 10 (FIG. 1) sends the displacement signal which is determined as previously described to the command valve as quickly as possible (step 331). The fourth sub-zone is a second "dead band" (i.e., pump/motor stays at full displacement even though pedal depression suggests a "little more" torque) to keep the pump/motor 22 at the efficient, full displacement as long as possible. If the driver depresses the pedal into Zone 2 (step 350), the second drive pump/motor 21 begins providing torque, sending the second, larger pump/motor 21 to a displacement setting above ⅓ displacement (for this example) and simultaneously sending the smaller pump/motor 22 to zero displacement. Within Zone 2, the electronic control unit sends a signal for the displacement of the larger pump/motor 21 to the command value as quickly as possible as it operates between ⅓ and full displacement (step 351) and a command signal to pump/motor 22 to go to zero displacement (step 352). If the driver depresses the pedal 90 into Zone 3 (step 360), both pump/motors 21, 22 are issued commands (steps 361, 362) to provide torque at the most efficient combined displacement settings to satisfy the commanded torque up to full displacement of both pump/motors. Obviously, if more than two drive pump/motors are utilized, the same logic would continue for the additional pump/motors until all are utilized at full displacement. Similar control logic would apply for regenerative braking, keyed to brake pedal depression.

Figure 8:
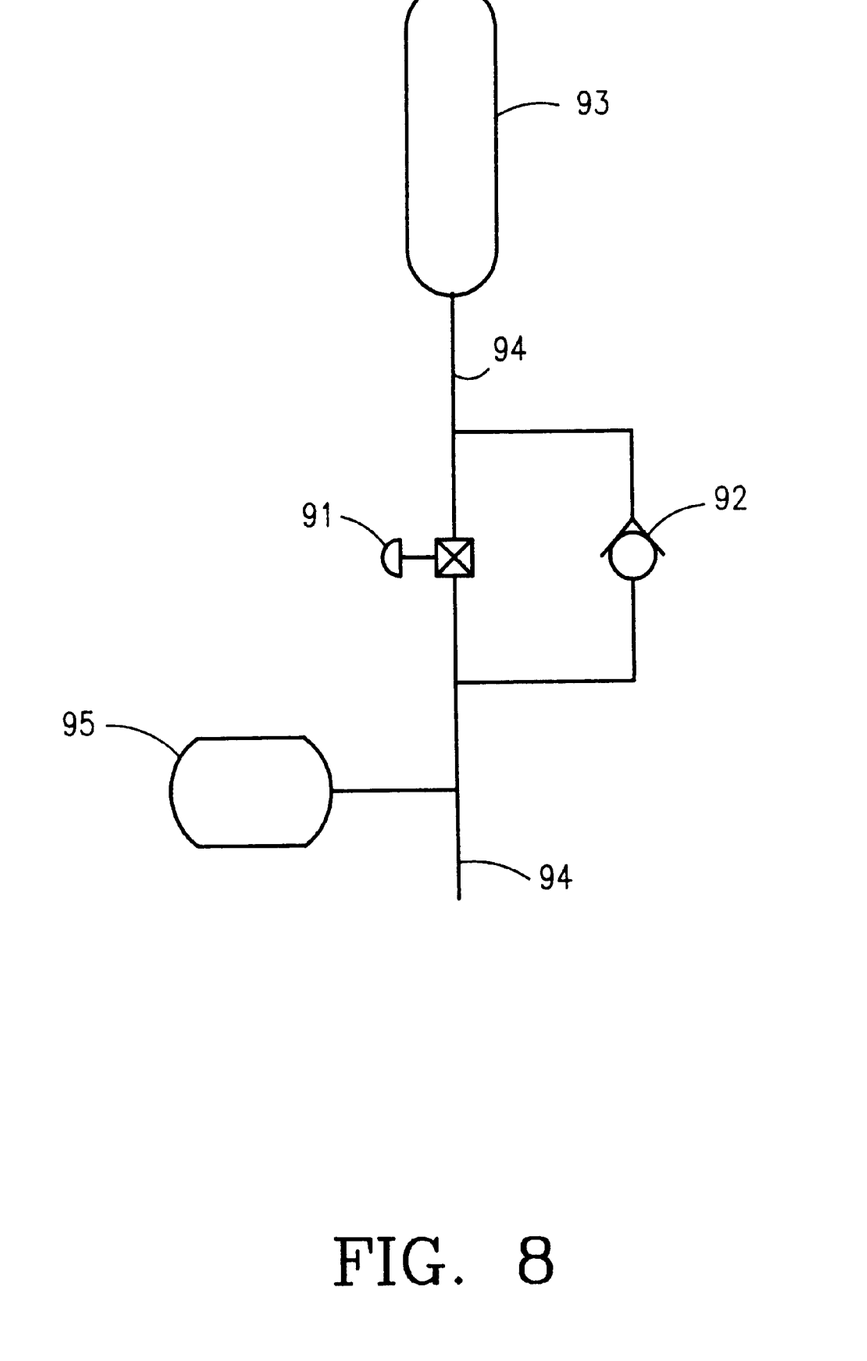
FIG. 8 is a schematic diagram of a modified portion of the embodiment of FIG. 1.

FIG. 8 illustrates another embodiment of the invention which provides efficient torque over the large range of torque commands typical of motor vehicle operation without requiring multiple drive pump/motors or a speed change transmission between the drive pump/motor(s) and the drive wheels, and which will also provide the highest torque possible with the available drive pump/motor(s) when commanded. In the embodiment of FIG. 8 high pressure line 94 replaces high pressure line 14 in the embodiment of FIG. 1 and connects to control circuit 15 in the same manner as high pressure line 14 which it replaces. The other components shown in FIG. 8 replace high pressure accumulator 13, but the remainder of the structure shown in FIG. 1 is included, without change, though unshown in FIG. 8. The embodiment of FIG. 8 will "valve out" the high pressure accumulator and operate in a direct hydrostatic mode when high torque is commanded. At low and medium torque commands the drive pump/motor(s) operate in the manner previously described. For higher torque commands than can be supplied by full displacement of the drive pump/motor(s) at the instant system pressure, the high pressure accumulator is "valved out" of the hydraulic circuit, and the engine supplies sufficient hydraulic power to raise the system pressure to the commanded torque. In this manner, the drive pump/motor(s) operate at the highest efficiency (i.e., the optimum displacement and pressure) possible in satisfying the commanded torque, up to that torque corresponding to maximum displacement at maximum rated system pressure.

Operation of the drivetrain of FIG. 8 will now be described with reference to operation when the vehicle is at a low speed and a command for maximum acceleration (i.e., maximum torque) is received. At low vehicle speeds and at hydraulic system pressures below the maximum system pressure rating, the engine is able to deliver more power than the drive pump/motors can utilize. With the high pressure accumulator 93 open the engine 11 would pump hydraulic fluid into the high pressure accumulator, even though the drive pump/motors are at full displacement. If the system rated pressure is 5000 psi and the instantaneous system pressure is 2500 psi, the drive pump/motors 21, 22 can provide only one-half the torque (and power) available at 5000 psi. Therefore, removing the high pressure accumulator 93 from the hydraulic circuit immediately increases the system pressure to (for this example) 5000 psi, and maximum possible torque (and power) is provided to the wheels. Referring to FIG. 8, flow into the high pressure accumulator 93 through high pressure line 94 is terminated by closing valve 91. The engine power must, at very low vehicle speeds, be managed to correspond to the power associated with the hydraulic fluid flow rate through the pump/motors 21, 22 to avoid exceeding the maximum system rated pressure. An optional, small auxiliary high pressure accumulator 95 (smaller than accumulator 93) may also be added to the circuit as shown in FIG. 8 to moderate the system pressure when the larger high pressure accumulator 93 is not allowed to receive fluid. As the vehicle speed and pump/motor 12 speed increase (FIG. 1), additional flow occurs and more power from the engine is supplied. This continues up to the maximum power output of the engine 11. Beyond the vehicle speed associated with maximum engine power output, the displacement of the drive pump/motors 21, 22 is reduced while continuing to utilize the maximum power available from the engine 11 until the maximum acceleration rate command from the vehicle driver ceases (i.e., until the accelerator pedal depression is reduced). The high pressure accumulator 93 is again returned to the hydraulic circuit by opening valve 91 when the system pressure and the pressure in high pressure accumulator 93 are equal, and "normal" operation (i.e., operation as previously described) resumes. Optional check valve 92 may be added to the circuit to smooth the transition of adding the high pressure accumulator 93 back to the system. When system pressure falls below the pressure in high pressure accumulator 93, fluid begins flowing again from high pressure accumulator 93, through check valve 92 to the hydraulic circuit. Valve 91 can be opened without causing any pressure spike in the system since the pressure in the system and high pressure accumulator 93 are assured to be equal.

Figure 9:
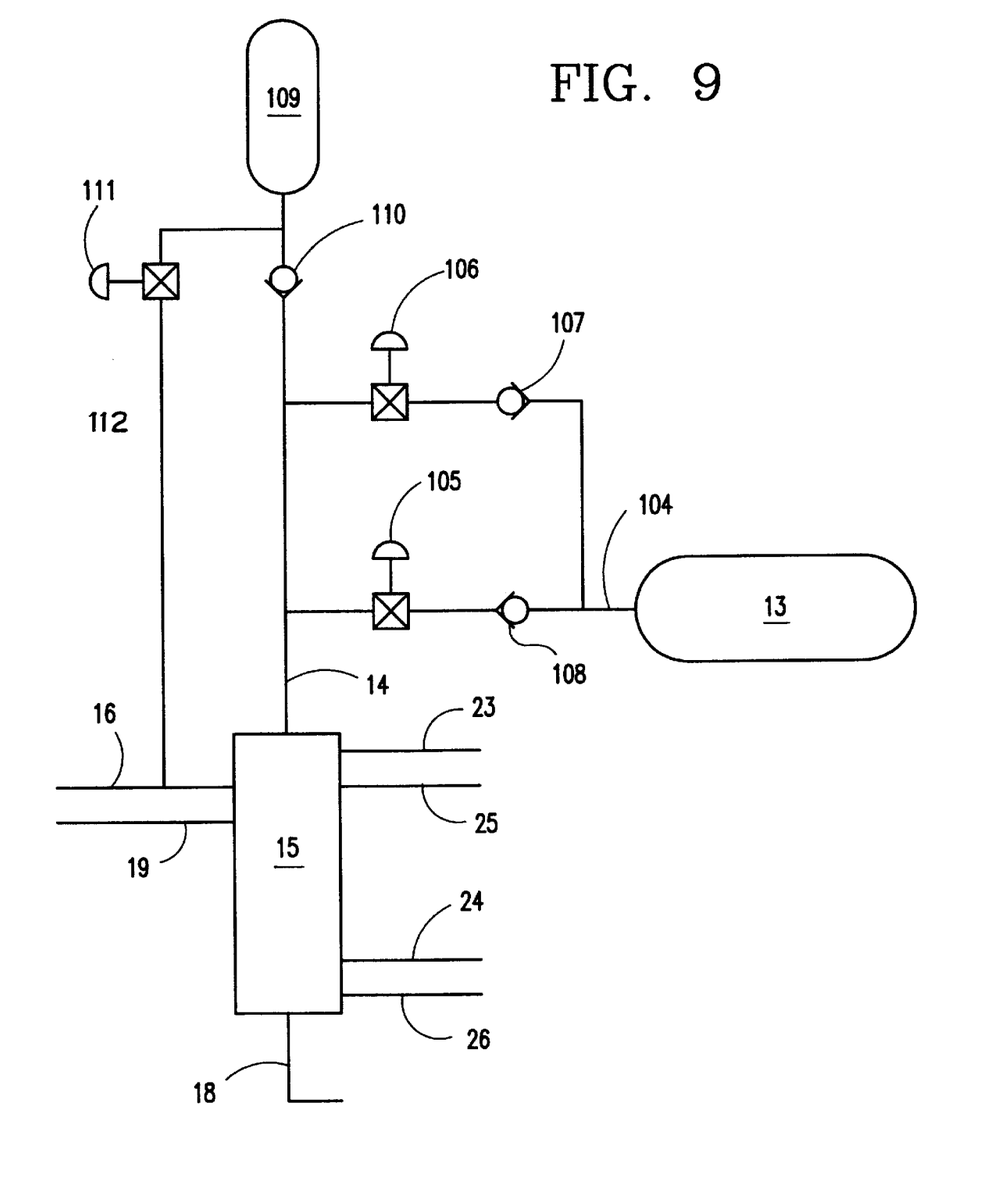
FIG. 9 is a schematic diagram of another modification of a portion of the drivetrain of FIG. 1.

FIG. 9 shows still another alternative embodiment of the invention for operation in a direct hydrostatic mode of operation by "valving out" the high pressure accumulator as was just described. In FIG. 9 components identical to those of FIG. 1 are depicted with the same reference numerals and the components to which lines 16, 18, 19, 23, 24, 25 and 26 connect are the same as in FIG. 1. This embodiment provides for operation in the direct hydrostatic mode at certain low and medium torque commands, as well as when high torque is commanded. The functioning of this embodiment will be described with reference to operation when the vehicle is at any speed and a command for low or medium torque is received, but the instantaneous system pressure is sufficiently high that the resultant drive pump/motor displacement is so low that it would operate at a lower than desired efficiency. Flow from high pressure accumulator 13 through high pressure line 104 is terminated by closing valve 105 (without optional valve 106 and optional check valves 107 and 108 included in the circuit). Engine power output is reduced to the power required by the vehicle, and the system pressure drops to a specified minimum value thus allowing/requiring the drive pump/motor(s) 21, 22 to increase displacement to maintain the commanded torque and thereby operate at an increased efficiency. Higher torque commands are easily satisfied as was previously described for the direct hydrostatic mode of operation. However, when a torque command is received that would result in an engine power output at that vehicle speed that is below the lowest efficient power output level defined for the engine 11, then the high pressure accumulator 13 must be added back to the hydraulic circuit and thus valve 105 must be opened. To avoid a hydraulic pressure spike to the system, the system pressure must be raised to the high pressure accumulator pressure before valve 105 is opened. Then the engine 11 can continue operating at a minimum efficient power level by pumping hydraulic fluid into high pressure accumulator 13 or, if the system pressure is above the target level for the vehicle speed, the engine 11 can be turned off while vehicle power is supplied by the accumulator 13. To minimize the difficulty of exactly matching the system pressure with the high pressure accumulator pressure before opening valve 105, optional valve 106 and optional check valves 107 and 108 may be added to the circuit. Valve 105 and valve 106 are both open when the direct hydrostatic mode of operation is not being used. When system pressure higher than is instantly available from high pressure accumulator 13 is desired, valve 105 is closed and the high torque hydrostatic mode of operation as previously described is active. When system pressure lower than is instantly available from high pressure accumulator 13 is desired, the direct hydrostatic mode of operation for certain low and medium torque commands is provided by closing valve 106. When system pressure rises above the pressure in high pressure accumulator 13, fluid begins flowing again from the system into high pressure accumulator 13 through check valve 108. Valve 106 can then be opened without causing any pressure spike in the system since the pressure in the system and high pressure accumulator 13 are assured to be equal.

The embodiment shown in FIG. 9 also includes a small auxiliary accumulator 109 which is utilized to start the engine 11. When utilizing control logic which includes operation at low system pressure, the engine pump/motor 12 operating as a motor must be large enough to start the engine with lowest allowable system pressure. This results in a pump/motor larger than is needed or desired (for best efficiency) for operation as a pump. The embodiment shown on FIG. 9 allows utilization of a significantly smaller engine pump/motor 12. Since the system pressure cycles between low values and high values, check valve 110, interposed between said auxiliary accumulator 109 and said high pressure line 14, allows fluid to enter auxiliary accumulator 109 and be charged to the highest pressure reached since the last engine start. A valve 111, in a by-pass line 112 has been in the closed position since the last engine operation. When it becomes necessary to start the engine, valve 111 is opened, high pressure fluid flows to pump/motor 12 through by-pass line 112, and pump/motor 12 operates as a motor to start the engine 11. When the engine 11 starts, valve 111 is again closed and pump/motor 12 operates as a pump. Valve 32 and line 36 shown in FIG. 2 would not be used in this embodiment.

Another possible modification would mechanically isolate the engine and engine pump/motor from the remaining transmission of the preferred embodiment. Other modifications may be made by rearranging pump/motors and other components.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. An automotive powertrain comprising:
a pair of drive wheels;
at least one accumulator for receiving hydraulic fluid and storing pressure and for discharging the stored pressure;
a first hydraulic pump/motor for driving said drive wheels in a motor mode responsive to receipt of hydraulic fluid and for pumping hydraulic fluid to said accumulator responsive to braking;
an internal combustion engine having an engine crankshaft extending from said engine to a distal end;
a second hydraulic pump/motor utilizing said engine crankshaft as its input/output shaft and, when operating in a pump mode, pumping hydraulic fluid to at least one of said accumulator and said first hydraulic pump/motor wherein said second hydraulic pump/motor is a bent-axis piston pump including a drive plate fixed to said distal end of said engine crankshaft and pistons for rotatably driving said drive plate; and a common set of bearings used both as back bearings for said crankshaft and as drive bearings for said second hydraulic pump/motor.

2. The automotive powertrain of claim 1 additionally comprising a gear set through which said first hydraulic pump/motor is connected to said drive wheels, said first pump/motor providing input/output at a first input/output shaft integral therewith and fixed to one gear of said gear set for rotation therewith.

3. The automotive powertrain of claim 2 wherein said gear set is a reduction gear differential.

4. The automotive powertrain of claim 2 further comprising a third pump/motor providing input/output at a second input/output shaft integral therewith and fixed to said one gear for rotation therewith, said first and third pump/motors being located on opposing sides of said one gear with said first and second input/output shafts axially aligned with each other and joined together to form a single shaft with said one gear mounted thereon.

5. The automotive powertrain of claim 4 wherein said first and second drive shafts are integrated into a single drive shaft for said one gear.

6. The automotive powertrain of claim 4 wherein said first, second and third pump/motors are inline piston pumps.

7. The automotive powertrain of claim 6 wherein said first, second and third pump/motors are bent-axis piston pumps.

8. The automotive powertrain of claim 1 wherein said second hydraulic pump is a pump/motor which is also operable in a motor mode to start said engine.

9. The automotive powertrain of claim 1 wherein said distal end of said engine crankshaft is a flange and said drive plate is axially aligned with said engine crankshaft and fixed to said flange.

10. An automotive powertrain comprising:

a pair of drive wheels;

an internal combustion engine;

a first pump/motor for driving said drive wheels in a motor mode responsive to receipt of high pressure fluid from a high pressure line and for operation in a pump mode to deliver high pressure fluid to the high pressure line responsive to braking of said drive wheels;

a second pump/motor driven by said internal combustion engine for operation in a pump mode to deliver high pressure fluid to said high pressure line;

a high pressure accumulator for receiving and discharging high pressure fluid through said high pressure line;

a low pressure accumulator for receiving and discharging low pressure fluid through a low pressure line;

a hydraulic controller, connected to said high and low pressure lines, for controlling fluid flow to and from said first and second pump/motors and to and from said high and low pressure accumulators;

first and second parallel lines connecting respective opposing sides of said first pump/motor to said hydraulic controller;

a cutoff valve in said high pressure line for, in a closed state, preventing flow of hydraulic fluid to said high pressure accumulator; and an auxiliary accumulator having a smaller capacity than said high pressure accumulator and located between said cutoff valve and said second hydraulic pump, said auxiliary accumulator moderating pressure within said high pressure line when said high pressure accumulator is not allowed to receive fluid.

11. The automotive powertrain of claim 10 additionally comprising a check valve, in parallel with said cutoff valve, for preventing flow of hydraulic fluid into said high pressure accumulator while allowing flow of hydraulic fluid from said high pressure accumulator.

12. An automotive powertrain comprising:

a pair of drive wheels;

an internal combustion engine;

a first pump/motor for driving said drive wheels in a motor mode responsive to receipt of high pressure fluid from a high pressure line and for operation in a pump mode to deliver high pressure fluid to the high pressure line responsive to braking of said drive wheels;

a second pump/motor driven by said internal combustion engine for operation in a pump mode to deliver high pressure fluid to said high pressure line;

a high pressure accumulator for receiving and discharging high pressure fluid through said high pressure line;

a low pressure accumulator for receiving and discharging low pressure fluid through a low pressure line;

a hydraulic controller, connected to said high and low pressure lines, for controlling fluid flow to and from said first and second pump/motors and to and from said high and low pressure accumulators;

first and second parallel lines connecting respective opposing sides of said first pump/motor to said hydraulic controller;

first and second cutoff valves in parallel between (1) said high pressure accumulator and (2) said high pressure line and said hydraulic controller;

first and second check valves in parallel with each other and in series with, respectively, said first and second cutoff valves, said first check valve permitting flow only into said high pressure accumulator and said second check valve permitting flow only from said high pressure accumulator.

13. The automotive powertrain of claim 12 further comprising:

an auxiliary accumulator, having a smaller capacity than said high pressure accumulator, connected to said high pressure line and to said second pump/motor through a by-pass line and a control valve in said by-pass line for, when opened, allowing high pressure fluid to flow from said auxiliary accumulator to operate said second pump/motor in a motor mode to start said internal combustion engine.

14. The automotive powertrain of claim 13 further comprising:

a check valve between said auxiliary accumulator and said high pressure line to allow fluid flow only in a direction from said high pressure line into said auxiliary accumulator.

15. An automotive powertrain comprising:

a pair of drive wheels;

an internal combustion engine with a crankshaft for power output;

at least one accumulator for receiving hydraulic fluid and storing pressure and for discharging the stored pressure;

a gear set connected to said drive wheels first and second hydraulic pump/motors, located on opposing sides of one gear of said gear set and sharing a common input/output shaft therebetween with said one gear mounted thereon, said first and second hydraulic motors being axially aligned and fixed to opposite ends of the common input/output shaft, said first and second hydraulic motors, operating in a motor mode to drive said drive wheels through said gear set and in a pump mode for pumping hydraulic fluid into said accumulator responsive to braking of said drive wheels;

a third hydraulic pump driven by said internal combustion for pumping hydraulic fluid to at least one of said accumulator and said first and second hydraulic pump/motors in a pump mode.

16. The automotive powertrain of claim 15 wherein said first and second hydraulic pump/motors are inline piston pumps.

17. The automotive powertrain of claim 15 wherein said first and second hydraulic pump/motors are bent-axis piston pumps.

18. The automotive powertrain of claim 15 wherein said third hydraulic pump has a shaft fixed to said crankshaft for rotation therewith.

19. An automotive powertrain comprising:

a pair of drive wheels;

an internal combustion engine;

a first pump/motor for driving said drive wheels in a motor mode responsive to receipt of high pressure fluid from a high pressure line and for operation in a pump mode to deliver high pressure fluid to the high pressure line responsive to braking of said drive wheels;

a second pump/motor driven by said internal combustion engine for operation in a pump mode to deliver high pressure fluid to said high pressure line;

a high pressure accumulator for receiving and discharging high pressure fluid through said high pressure line;

a low pressure accumulator for receiving and discharging low pressure fluid through a low pressure line;

first and second parallel lines for connecting, in parallel, one side of said first pump/motor to said high pressure and low pressure lines, respectively, said first parallel line having a first valve which opens to admit high pressure fluid from said high pressure line to said one side of said first pump/motor in forward drive, said second parallel line having a second valve which opens to admit low pressure fluid from said low-pressure line to said one side of said first pump/motor in reverse drive;

third and fourth parallel lines connecting, in parallel, a second side of said first pump/motor to said low pressure and high pressure lines, respectively, said third parallel line having a third valve which opens to admit low pressure fluid from said low pressure line to said second side of said first pump/motor in forward drive, said fourth parallel line having a fourth valve which opens to admit high pressure fluid from said high pressure line to said second side of said first pump/motor in reverse drive, wherein all of said first through fourth valves are check valves and are in a closed, checked position in said pump mode.

20. The automotive powertrain of claim 19 further comprising:

fifth and sixth parallel lines connecting, in parallel, one side of said second pump/motor to said high pressure and low pressure lines, respectively, said fifth parallel line having a fifth valve which opens to admit high pressure fluid from said high pressure line to said one side of said second pump/motor, said sixth parallel line having a sixth valve in the form of a check valve preventing fluid flow form said high pressure line to said low pressure line; and seventh and eighth parallel lines connecting, in parallel, a second side of said second pump/motor, said seventh parallel line having a seventh valve which opens to admit low pressure fluid from said low pressure line to said second side of said second pump/motor, said eighth parallel line having a eighth valve in the form of a check valve preventing flow from said high pressure line into said low pressure line.

21. The automotive powertrain of claim 20 wherein said valves in said sixth and eight parallel lines are check valves.

22. The automotive powertrain of claim 20 further comprising:

a third pump/motor for driving said drive wheels in a motor mode responsive to feed of high pressure fluid thereto and for operation in a pump mode to discharge high pressure fluid to the high pressure line responsive to braking of said wheels;

ninth and tenth parallel lines connecting, in parallel, one side of said third pump/motor to said high pressure and low pressure lines, respectively, said ninth parallel line having a ninth valve which opens to admit high pressure fluid from said high pressure line to one side of said third pump/motor, said tenth parallel line having a tenth valve in the form of a check valve preventing high pressure fluid from flowing from said high pressure line into said low pressure line; and eleventh and twelfth parallel lines connecting, in parallel, a second side of said third pump/motor to said low pressure and high pressure lines, respectively, said eleventh parallel line having a valve which opens to admit low pressure fluid from said low pressure line to said second side of said third pump/motor and said twelfth parallel line having a twelfth valve in the form of a check valve to prevent high pressure fluid from flowing from said high pressure line into said low pressure line.

23. The automotive powertrain of claim 22 further comprising:

gear set through which said drive wheels are driven by said first and third pump/motors; and wherein said first and third pump/motors are mounted coaxially on opposing sides of one gear of said gear set, said first and third pump/motors each providing input/output at an input/output shaft integral therewith, said input/output shafts integrated into a single driveshaft having said one gear mounted thereon.

24. The automotive powertrain of claim 22 wherein said valves in said sixth and eighth lines are check valves.

25. The automotive powertrain of claim 22 wherein:

said first, second, third, fourth, fifth, seventh, ninth and eleventh valves have check valve functions when closed; and said first, fourth, fifth and ninth valves always allow high pressure flow from said pump/motor into said high pressure line; and said second, third, seventh and eleventh valves always allow flow from said pump/motor into said low pressure line.

26. The automotive power train of claim 19 wherein said high pressure and low pressure accumulators contain a compressible gas.

27. An automotive powertrain comprising:

a pair of drive wheels;

an internal combustion engine;

a first pump/motor operable over center for driving said drive wheels in a motor mode responsive to receipt of high pressure fluid from a high pressure line and for operation in a pump mode to deliver high pressure fluid to said high pressure line responsive to braking of said drive wheels;

a second pump/motor operable over center for starting said internal combustion engine in a motor mode responsive to receipt of high pressure fluid from said high pressure line and driven by said internal combustion engine for operation in a pump mode to deliver high pressure fluid to said high pressure line;

a high pressure accumulator in communication with said high pressure line;

a low pressure accumulator in communication with a low pressure line;

first and second parallel lines for connecting, in parallel, one side of said first pump/motor to said high pressure and low pressure lines, respectively, said first parallel line having a first valve which opens to admit high pressure fluid from said high pressure line to said one side of said first pump/motor, said second parallel line having a second valve in the form of a check valve for preventing fluid flow from said high pressure line to said low pressure line; wherein a second side of said first pump/motor is connected to said low pressure line; and third and fourth parallel lines connecting, in parallel, one side of said second pump/motor to said high pressure and low pressure lines, respectively, said third parallel line having a third valve which opens to admit high pressure fluid from said high pressure line to said one side of said second pump/motor, said fourth parallel line having a fourth valve in the form of a check valve for preventing fluid flow from said high pressure line to said low pressure line; and wherein a second side a second pump/motor is connected to said low pressure line.

28. An automotive powertrain according to claim 27 additionally comprising:

a third pump/motor operable overcenter for driving said drive wheels in a motor mode responsive to feed of high pressure fluid thereto and for operation in a pump mode to discharge high pressure fluid to the high pressure line responsive to braking of said drive wheels;

fifth and sixth parallel lines connecting, in parallel, one side of said third pump/motor to said high pressure and low pressure lines, respectively, said fifth parallel line having a fifth valve which opens to admit high pressure fluid from said high pressure line to said one side of said third pump/motor, said sixth parallel line having a sixth valve in the form of a check valve preventing high pressure fluid from flowing from said high pressure line into said low pressure line; and wherein a second side of said third pump/motor is connected directly to said low pressure line.

29. An automotive powertrain according to claim 28 wherein said valves in said second, fourth and sixth parallel lines are check valves.

30. The automotive powertrain of claim 28 further comprising:

a gear set through which said drive wheels are driven by said first and third pump/motors; and wherein said first and third pump/motors are mounted coaxially with and on opposing sides of a drive gear of said gear set, said first and third pump/motors having shafts integrated into one drive shaft for said drive gear.

31. The automotive powertrain of claim 28 wherein said first, third and fifth valves have check valve functions when closed to always allow high pressure flow from said pump/motors to said high pressure line.

32. An automotive powertrain according to claim 27 wherein said valve in said second parallel line is a check valve.

33. An automotive powertrain according to claim 27 wherein said valves in said second and fourth parallel lines are check valves.

34. An automotive powertrain comprising:

a pair of drive wheels;

an internal combustion engine;

a first fluidic motor for driving said drive wheels responsive to receipt of high pressure fluid from a high pressure line;

a pump driven by said internal combustion engine to deliver high pressure fluid to said high pressure line;

a high pressure accumulator for receiving and discharging high pressure fluid through said high pressure line;

a low pressure accumulator for receiving and discharging low pressure fluid through a low pressure line;

a second fluidic motor, having a smaller capacity than said first fluidic motor, for driving said drive wheels responsive to receipt of high pressure fluid from said high pressure line;

a sensor for detecting position of an accelerator element within a range of movement divided into zones; and an electronic control unit for selectively generating command signals for operation of said first fluidic motor and/or said second fluidic motor in accordance with the zone in which the accelerator element is positioned, said electronic control unit generating a first command signal for operation of said second fluidic motor alone in a first zone, said first command signal changing responsive to positioning of said accelerator element within a subzone of the first zone and leaving said first command signal unchanged with movement of said accelerator element within another subzone of the first zone, generating a second command signal for operation of said first fluidic motor alone responsive to detection of said accelerator element within a second zone and generating command signals for operation of both of said first and second fluidic motors responsive to detection of said accelerator element within a third zone.

35. The automotive powertrain of claim 34:

wherein said accelerator element is an accelerator pedal; and wherein, upon depression of said accelerator pedal, said accelerator pedal moves, in succession, through said first, second and third zones.

\* \* \* \* \*